United States Patent [19]
Yamamoto

[11] 3,803,457
[45] Apr. 9, 1974

[54] BLOCK TYPE ELECTROLYTIC CAPACITOR

[75] Inventor: Hirotsugu Yamamoto, Nagano-ken, Japan

[73] Assignee: Nichicon Capacitor Limited, Nakagyo-ku, Kyoto, Japan

[22] Filed: May 7, 1973

[21] Appl. No.: 357,680

[30] Foreign Application Priority Data
May 9, 1972 Japan.............................. 47-45715

[52] U.S. Cl.................... 317/230, 317/242, 29/570
[51] Int. Cl............................................. H01g 9/00
[58] Field of Search ............. 317/230, 242; 29/570

[56] References Cited
UNITED STATES PATENTS

| | | | |
|---|---|---|---|
| 2,841,771 | 7/1958 | Dunleavey | 317/230 |
| 2,982,891 | 5/1961 | Gables | 317/230 |
| 3,239,595 | 3/1966 | Reese et al. | 317/230 X |
| 3,537,173 | 11/1970 | Sparrow et al. | 317/230 X |
| 3,538,394 | 11/1970 | Bourgault et al. | 317/230 |

Primary Examiner—Andrew J. James

[57] ABSTRACT

An electrolytic capacitor consisting of a plurality of rolled cylindrical capacitors arranged in coaxial relationship and isolated one from the other to prevent intermixing of the electrolytes of each capacitor element.

1 Claim, 1 Drawing Figure

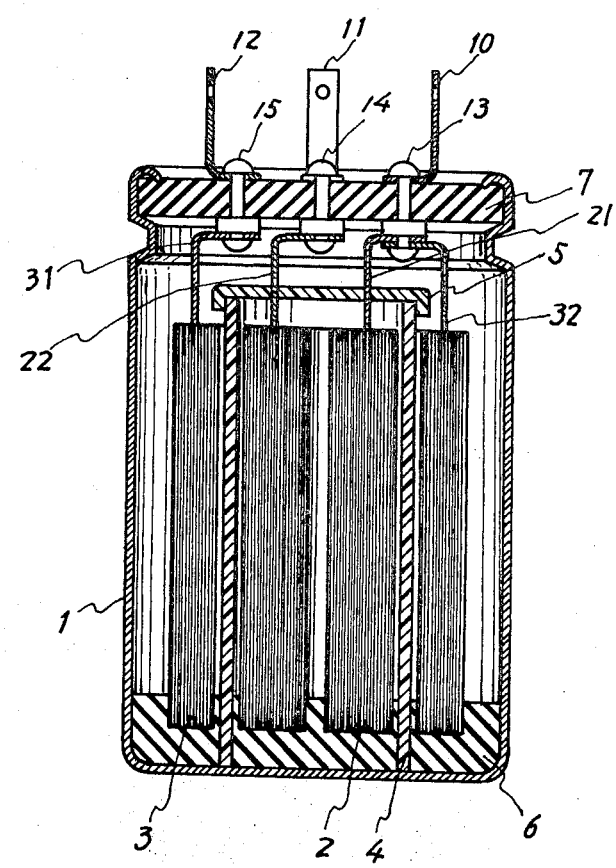

BLOCK TYPE ELECTROLYTIC CAPACITOR

This invention relates to a block type electrolytic capacitor and more particularly to a novel and improved structure therefor.

Most of the prior art block type electrolytic capacitors include a composite capacitor element, a common cathode terminal and a plurality of anode terminals. The composite capacitor element consists of a single cathode foil and a plurality of anode foils laminated with intervening electrolytic paper and wound into a roll. Such block type electrolytic capacitors have had an unavoidable disadvantage in that a much larger leakage current may appear between both electrodes than that encountered in structures having discrete electrolytic capacitors. This tendency is especially marked in those having different applied voltages. Therefore, they have not been used in those circuits wherein leakage current presented a problem.

Accordingly, an object of this invention resides in the provision of an improved structure of a block type electrolytic capacitor which exhibits materially reduced leakage current between the electrodes.

According to this invention, the block type electrolytic capacitor includes a plurality of capacitor elements individually impregnated with various electrolytes and at least one insulating member between said capacitor elements for preventing intermixing of said electrolytes from the several capacitor elements.

The invention will be described in detail hereinunder with reference to the accompanying drawing.

The single drawing represents a vertical sectional view of an embodiment of a block type electrolytic capacitor according to this invention.

A metallic casing 1 contains two cylindrical capacitor elements 2 and 3 which are arranged coaxially. Each of the capacitor elements 2 and 3 is a discrete capacitor consisting of a laminated roll of a plurality of electrode foils and intervening papers and provided with a pair of electrode terminals 21 and 22 and 31 and 32. Between the capacitor elements 2 and 3 there is disposed an insulating hollow cylinder 4 made of synthetic resin for example. The upper end of the cylinder 4 is closed by a cap 5 through which the terminals 21 and 22 extend. The cap 5 is made of an insulating material similar to that of the hollow cylinder 4. The lower ends of the capacitor elements 2 and 3 and the hollow cylinder 4 are embedded in and fixed within a pitch layer 6. A terminal plate 7 provided with three terminals 10, 11 and 12 which are fixed thereto with rivets 13, 14 and 15 is fitted within the upper opening of the casing 1 and fixed in place by swaging the edge of the opening inwardly. The cathode terminal 21 of the capacitor element 2 and the anode terminal 32 of the capacitor element 3 are connected together at the lower end of the rivet 13 and the anode terminal 22 of the capacitor element 2 and the cathode terminal 31 of the capacitor element 3 are respectively connected to the lower ends of the rivets 14 and 15.

In manufacture an anode foil having the terminal 22 welded thereto and a cathode foil having the terminal 21 welded thereto are placed one upon the other with intervening electrolytic paper layers and wound into a roll to form the capacitor element 2. Another pair of anode and cathode foils respectively provided with the anode terminal 32 and the cathode terminal 31 and intervening electrolytic papers are wound on the hollow cylinder 4 having an inner diameter which is a little larger than the outer diameter of the capacitor element 2, to form the capacitor element 3. The capacitor elements 2 and 3 are then impregnated with preselected electrolytes respectively and the excessive electrolytes are removed. The element 2 is inserted into the hollow cylinder 4 having the element 3 wound thereon and the cap 5 is put on the cylinder 4 so that the terminals 21 and 22 extend therethrough. The cap 5 may be adhered to the cylinder 4 with a suitable adhesive agent. Then, the terminals 21, 22, 31 and 32 of both capacitor elements 2 and 3 are respectively connected to the lower ends of the rivets 13, 14 and 15 which are previously fixed to the terminal plate 7 as described in the above by crushing the rivet ends. Then, the assembled elements are inserted in the casing 1 after pouring a proper amount of molten pitch 6 in the casing and the terminal plate 7 is fitted within the opening of the casing and fixed by swaging the edge of the opening inwardly.

As described in the above, the capacitor elements 2 and 3 of this invention are perfectly isolated from each other through the insulating hollow cylinder 4 and the pitch layer 6 so that the leakage current between both elements is markedly reduced in comparison with the prior art capacitors. Moreover, the electrolytic capacitor of this invention has an additional advantage in that the respective capacitor elements can be impregnated with different kinds of electrolytes since the elements are separated by the hollow cylinder 4 and there is no intermixing of the electrolytes of the separate elements. Therefore, each capacitor element of this inventive capacitor can be impregnated with an electrolyte which is most suitable for its use.

It is understood that the above description was only made in conjunction with the illustrated embodiment of the invention and various modifications and changes can be made within a scope of this invention. For example, the synthetic resin cylinder 4 may be replaced by a cylinder made of another insulating material such as a ceramic or resin-worked fiber. The pitch layer 6 may be replaced by a suitable synthetic resin layer. Further, any number of capacitor elements may be arranged coaxially with similar intervening hollow cylindrical insulating members and the electrode terminals of these elements may be coupled with each other in a suitable combination and led out as a suitable number of capacitor terminals in accordance with its use. For example, the electrode terminals 21, 22, 31 and 32 may be led out as one common cathode terminal and two anode terminals or as four individual terminals in place of the three terminals as described above.

What is claimed is:

1. A block type electrolytic capacitor comprising a plurality of cylindrically rolled capacitor elements, said capacitor elements being impregnated with electrolytes and arranged in coaxial and substantially coextensive relationship, and at least one hollow cylindrical insulating member disposed between said capacitor elements for prevently intermixing of the electrolytes of said capacitor elements.

* * * * *